(12) United States Patent
Tanaka et al.

(10) Patent No.: US 11,242,288 B2
(45) Date of Patent: Feb. 8, 2022

(54) SINTERED NI FERRITE BODY, COIL DEVICE, AND METHOD FOR PRODUCING SINTERED NI FERRITE BODY

(71) Applicant: HITACHI METALS, LTD., Tokyo (JP)

(72) Inventors: Satoru Tanaka, Tottori (JP); Norikazu Koyuhara, Tokyo (JP); Tomoyuki Tada, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 204 days.

(21) Appl. No.: 16/493,571

(22) PCT Filed: Mar. 15, 2018

(86) PCT No.: PCT/JP2018/010094
§ 371 (c)(1),
(2) Date: Sep. 12, 2019

(87) PCT Pub. No.: WO2018/168974
PCT Pub. Date: Sep. 20, 2018

(65) Prior Publication Data
US 2021/0139377 A1    May 13, 2021

(30) Foreign Application Priority Data
Mar. 15, 2017    (JP) .............................. JP2017-050011

(51) Int. Cl.
*C04B 35/26* (2006.01)
*C04B 35/626* (2006.01)
*C04B 35/64* (2006.01)

(52) U.S. Cl.
CPC ...... *C04B 35/2608* (2013.01); *C04B 35/6262* (2013.01); *C04B 35/62675* (2013.01);
(Continued)

(58) Field of Classification Search
CPC ............ C04B 35/2608; C04B 35/6262; C04B 35/62675; C04B 2235/3274; C04B 2235/3279; C04B 2235/3281; H01F 1/344
See application file for complete search history.

(56) References Cited

U.S. PATENT DOCUMENTS

| 7,034,649 B2* | 4/2006 | Asakura ................. C01G 49/00 252/62.59 |
| 8,164,410 B2* | 4/2012 | Tanaka .................. C04B 35/265 336/233 |

(Continued)

FOREIGN PATENT DOCUMENTS

| CN | 105683125 A | 6/2016 |
| EP | 2112126 A1 | 10/2009 |

(Continued)

OTHER PUBLICATIONS

Japanese Office Action for Japanese Application No. 2018-561290 dated Feb. 19, 2019.

(Continued)

*Primary Examiner* — Noah S Wiese
(74) *Attorney, Agent, or Firm* — Sughrue Mion, PLLC (57) ABSTRACT

A sintered Ni ferrite body having a composition comprising, calculated as oxide, 47.0-48.3% by mol of $Fe_2O_3$, 14.5% or more and less than 25% by mol of ZnO, 8.2-10.0% by mol of CuO, and more than 0.6% and 2.5% or less by mol of CoO, the balance being NiO and inevitable impurities, and having an average crystal grain size of more than 2.5 μm and less than 5.5 μm.

11 Claims, 1 Drawing Sheet

(52) U.S. Cl.
CPC ...... *C04B 35/64* (2013.01); *C04B 2235/3274* (2013.01); *C04B 2235/3279* (2013.01); *C04B 2235/3281* (2013.01); *C04B 2235/3284* (2013.01); *C04B 2235/602* (2013.01)

(56) References Cited

U.S. PATENT DOCUMENTS

| | | |
|---|---|---|
| 2005/0062576 A1 | 3/2005 | Asakura et al. |
| 2005/0258393 A1* | 11/2005 | Takane ............... C04B 35/265 252/62.6 |
| 2010/0085140 A1 | 4/2010 | Tanaka et al. |
| 2010/0321140 A1 | 12/2010 | Tanaka et al. |
| 2016/0284453 A1 | 9/2016 | Okano et al. |

FOREIGN PATENT DOCUMENTS

| | | |
|---|---|---|
| JP | 6-61033 A | 3/1994 |
| JP | 6-120021 A | 4/1994 |
| JP | 10-256024 A | 9/1998 |
| JP | 2005-306668 A | 11/2005 |
| WO | 2008/133152 A1 | 11/2008 |

OTHER PUBLICATIONS

International Search Report for PCT/JP2018/010094 dated May 22, 2018 [PCT/ISA/210].

Communication dated May 18, 2021, from the China National Intellectual Property Administration in application No. 201880018240.0.

* cited by examiner

SINTERED NI FERRITE BODY, COIL DEVICE, AND METHOD FOR PRODUCING SINTERED NI FERRITE BODY

CROSS REFERENCE TO RELATED APPLICATIONS

This application is a National Stage of International Application No. PCT/JP2018/010094 filed Mar. 15, 2018, claiming priority based on Japanese Patent Application No. 2017-050011 filed Mar. 15, 2017.

FIELD OF THE INVENTION

The present invention relates to a coil device such as a transformer, a choke coil, etc. used in switching power supplies, etc., a sintered Ni ferrite body used for a magnetic core constituting the coil device, and a method for producing the sintered Ni ferrite body.

BACKGROUND OF THE INVENTION

Switching power supplies are used in various power supply circuits in electronic apparatuses, such as electric vehicles (EVs), hybrid electric vehicles (HEVs), mobile communications equipments (cell phones, smartphones, etc.), personal computers, servers, etc.

Recent electronic apparatuses are increasingly required to be small and light in weight, consuming less electric power in order to have improved energy efficiency. Accordingly, large-scale integrated circuits (LSIs) such as digital signal processors (DSPs), micro-processing units (MPUs), etc., and functional elements used in electronic apparatuses are also required to be small and have high performance and low power consumption. On the other hand, recent higher integration of transistors by finer wiring in LSIs reduces the breakdown voltage of transistors and increases current consumption, resulting in increasingly lower operation voltage and larger current.

Power supply circuits such as DC-DC converters for supplying power to LSIs should also be adapted to lower-voltage, higher-current operation of LSIs. For example, lowering the operation voltage of LSIs narrows a normally operable voltage range, resulting in fluctuated voltage of LSIs due to the ripple of voltage from power supply circuits, so that the operation of LSIs becomes unstable. Accordingly, the switching frequencies of power supply circuits were increased, for example, to 500 kHz or more.

Increase in the frequency and current of power supply circuits is advantageous in reducing the sizes of magnetic cores constituting electronic devices such as transformers, choke coils, etc. used in circuits. For example, when a transformer is operated with a sinusoidal wave, voltage Ep (V) applied to a primary coil is expressed by the formula:

$$Ep = 4.44 \times Np \times A \times f \times Bm \times 10^{-7},$$

wherein Np represents the number of winding of the primary coil, A represents a cross section area (cm$^2$) of a magnetic core, f represents a frequency (Hz), and Bm represents an exciting magnetic flux density (mT). The formula indicates that when voltage Ep having a higher switching frequency f is applied to a primary coil, a magnetic core can have a smaller cross section area A, resulting in a smaller size. Also, since higher current increases the maximum exciting magnetic flux density (hereinafter simply referred to as "exciting magnetic flux density") Bm increases, a low loss material is required under high magnetic flux density.

Also, since an operating environment of power supply circuits may be about 100° C. due to heat generation of constituent devices and peripheral circuits; the power supply circuits are required to be stably operable at such high temperatures. In automotive applications, in particular, various mechanical and electrical load conditions occur to electronic parts during traveling, and the environmental temperature used is also various, so that a magnetic material having a high exciting magnetic flux density, being operable at high frequency, and having low core loss in a wide temperature range is required.

Suitably miniaturizable magnetic cores operated at a high exciting magnetic flux density in a high-frequency range are mainly made of Mn ferrite as a magnetic material. Mn ferrite has larger initial permeability and saturation magnetic flux density than those of Ni ferrite, etc., and smaller core loss than those of Fe-based amorphous alloys, Co-based amorphous alloys, pure iron, and magnetic metals such as Fe—Si alloys, Fe—Ni alloys, Fe—Si—Cr alloys, and Fe—Si—Al alloys. However, Mn ferrite is greatly affected by eddy current loss than Ni ferrite because of smaller specific resistance, and has lower usable limit frequency due to its high permeability. Accordingly, Mn ferrite has a problem that applications are limited because the loss increases at a frequency higher than 2 MHz.

Accordingly, Ni ferrite which can be operated at high frequencies exceeding 2 MHz has been developed. For example, JP H06-061033 A proposes a low-loss Ni ferrite made of a sintered body obtained by adding 0.1-1.2 wt % of $Co_3O_4$ to a basic composition containing 48.5-49.9% by mol of $Fe_2O_3$, 22.5-28.5% by mol of ZnO, 15-20% by mol of NiO, and 6.5-9.5% by mol of CuO, which has an average crystal grain size of 1-3 µm.

JP H06-120021 A proposes a Ni ferrite made of a sintered body obtained by adding 0.1-2.0 wt % of $Co_3O_4$ to a basic composition containing 45-49% by mol of $Fe_2O_3$, 15-30% by mol of ZnO, and 2-8% by mol of CuO, the balance being NiO, which has an average crystal grain size of 0.05-8 µm.

WO 2008/133152 A proposes a Ni ferrite containing 46.5-49.5% by mol of $Fe_2O_3$, 17-26% by mol of ZnO, 4-12% by mol of CuO, and 0.2% or more and less than 1.2% by mol of CoO, the balance being NiO, and further containing 0.03-1.4 parts by mass of Sn calculated as $SnO_2$, which has an average crystal grain size of 0.7-2.5 µm.

In order to reduce core loss at high frequencies, the Ni ferrites disclosed in JP H06-061033 A, JP H06-120021 A and WO 2008/133152 A contain Co, and further the Ni ferrite in WO 2008/133152 A contains Sn in addition to Co. However, it has been found that when the operating current is increased (exciting magnetic flux density is, for example, high as 20 mT) at a frequency of 5 MHz or more, the core loss may increase significantly as the temperature of the operating environment increases.

Object of the Invention

Accordingly, a first object of the present invention is to provide a Ni-ferrite having low core loss under operating conditions of high frequency and high exciting magnetic flux density with suppressed core loss at high-temperature of 100° C. or higher, thereby exhibiting low core less in a wide temperature range.

A second object of the present invention is to provide a coil device having a magnetic core made of said sintered Ni ferrite body.

A third object of the present invention is to provide a method for producing said sintered Ni ferrite body.

SUMMARY OF THE INVENTION

A sintered Ni ferrite body of the present invention is characterized in that it has a composition comprising, calculated as oxide, 47.0-48.3% by mol of $Fe_2O_3$, 14.5% or more and less than 25% by mol of ZnO, 8.2-10.0% by mol of CuO, and more than 0.6% and 2.5% or less by mol of CoO, the balance being NiO and inevitable impurities, and has an average crystal grain size of more than 2.5 μm and less than 5.5 μm.

The sintered Ni ferrite body of the present invention preferably contains less than 4 parts by mass of Sn calculated as $SnO_2$, based on 100 parts by mass of the total amount of $Fe_2O_3$, ZnO, CuO, CoO and NiO.

The sintered Ni ferrite body of the present invention preferably has a composition comprising, calculated as oxide, 47.3-48.2% by mol of $Fe_2O_3$, 14.8-24.8% by mol of ZnO, 8.3-9.5% by mol of CuO, and 0.65-2.4% by mol of CoO, the balance being NiO and inevitable impurities.

The sintered Ni ferrite body of the present invention preferably has a density of 4.85 $g/cm^3$ or more.

The sintered Ni ferrite body of the present invention preferably has core loss Pcv20 of 1800 $kW/m^3$ or less at 20° C. and core loss Pcv100 of 3000 $W/m^3$ or less at 100° C., at a frequency of 5 MHz and at an exciting magnetic flux density of 20 mT.

The sintered Ni ferrite body of the present invention preferably has the minimum temperature of core loss Pcv of less than 80° C.

The sintered Ni ferrite body of the present invention preferably has a core loss change ratio Ps calculated by the following formula (1):

$$Ps(\%)=[(Pcv100-Pcv20)/Pcv20]\times100 \qquad (1),$$

of 185% or less.

A coil device of the present invention is characterized in that formed by winding a wire around a magnetic core made of the above-mentioned sintered Ni ferrite body.

A method of the present invention for producing the above-mentioned sintered Ni ferrite body is characterized in that comprises the steps of mixing a iron oxide powder, a zinc oxide powder, a copper oxide powder, and a nickel oxide powder to form a raw material powder,
calcining the raw material powder at a temperature of 700-850° C. to form a calcined body,
pulverizing the calcined body with cobalt oxide, or cobalt oxide and tin oxide for 0.5-8 hours to form a pulverized powder,
molding the pulverized powder to form a green body, and sintering the green body at a temperature of 900-1000° C.

The pulverized powder preferably has a particle size of 0.5-1.5 μm.

Effects of the Invention

The sintered Ni ferrite body of the present invention has low core loss in a wide temperature range under operating conditions of high frequency and high exciting magnetic flux density. The sintered Ni ferrite body having such characteristics is suitable for a low-loss magnetic core for a coil device.

DESCRIPTION OF THE PREFERRED EMBODIMENTS

The embodiments of the present invention will be described in detail below, and it should be noted that explanations of one embodiment are applicable to other embodiments unless otherwise mentioned, and that the following explanations are not restrictive but may be modified within the scope of the present invention.

[1] Sintered Ni Ferrite Body (A) Composition (1) Essential Components

A sintered Ni ferrite body of the present invention has a composition comprising, calculated as oxide, 47.0-48.3% by mol of $Fe_2O_3$, 14.5% or more and less than 25% by mol of ZnO, 8.2-10.0% by mol of CuO, and more than 0.6% and 2.5% or less by mol of CoO, the balance being NiO and inevitable impurities. The sintered Ni ferrite body of the present invention may further contains less than 4 parts by mass of Sn calculated as $SnO_2$, based on 100 parts by mass of the total amount of $Fe_2O_3$, ZnO, CuO, CoO and NiO.

(a) $Fe_2O_3$

Less than 47.0% or more than 48.3% by mol of $Fe_2O_3$ provides insufficient effect of reduced core loss in the temperature range of 20-100° C. at a frequency of 5 MHz and an exciting magnetic flux density of 20 mT. In addition, initial permeability pi is low when $Fe_2O_3$ is less than 47.0% by mol. The lower limit of the content of $Fe_2O_3$ is preferably 47.3% by mol, and more preferably 47.4% by mol. The upper limit of the content of $Fe_2O_3$ is preferably 48.2% by mol, and more preferably 48.1% by mol.

(b) ZnO

Less than 14.5% or 25% or more by mol of ZnO provides insufficient effect of reduced core loss in the temperature range of 20-100° C. at a frequency of 5 MHz and an exciting magnetic flux density of 20 mT. In addition, initial permeability pi is low when ZnO is less than 14.5% by mol. The lower limit of the content of ZnO is preferably 14.8% by mol. The upper limit of the content of ZnO is preferably 24.8% by mol, more preferably 24.6% by mol, and most preferably 24.4% by mol.

When the content of $Fe_2O_3$ and ZnO are within the above range, the sintered Ni ferrite body has the Curie temperature (Tc) of 250-450° C., thus, can be used without problems at an environmental temperature of about 100° C.

(c) CuO

When CuO is less than 8.2% by mol, sintering at high temperature is required for densification, coarse crystal grains appear in the sintered body, making it difficult to obtain a fine crystal structure. On the other hand, when CuO exceeds 10% by mol, excess Cu easily precipitates at grain boundaries, thereby increasing sinterability and making it difficult to obtain a fine crystal structure as well. The lower limit of the content of CuO is preferably 8.3% by mol, and more preferably 8.5% by mol. Moreover, the upper limit of the content of CuO is preferably 9.5% by mol, and more preferably 9.0% by mol. Whether or not the sintered Ni ferrite body has a microcrystalline structure is determined in the following procedure with respect to a sample obtained by thermal etching the sintered Ni ferrite body at a temperature lower than the sintering temperature. The procedure comprises the steps of, first, (a) taking scanning electron microscope (SEM) photographs (3000 times and 5000 times) of a cross section of the sample, (b) counting the number of crystal grains having a maximum diameter of 10 μm or more surrounded by grain boundaries in the SEM photograph of 3000 times (observed area: 33 μm×43 μm), (c) calculating an average crystal grain size in accordance with the method described below in the SEM photograph of 3000 times (observed area: 33 μm×43 μm) or the SEM photograph of 5000 times (observed area: 20 μm×26 μm), and (d) determining to have a microcrystalline structure when the number of crystal grains having a maximum diameter of 10 μm or more is 10 or less and the average crystal grain size is less than 5.5 μm. The thermal etching may be conducted at a temperature at which crystal grain boundaries can be confirmed, typically, the temperature being preferably about 50-100° C. lower than the sintering temperature of the sintered Ni ferrite body. When the sintering temperature of the sintered Ni ferrite body is unknown, thermal etching may be started at a low temperature, and the temperature may be gradually raised until the grain boundaries can be confirmed.

(d) CoO

CoO is a component that contributes to the reduction of core loss at high frequencies. In general, a sintered Ni ferrite body has a negative crystal magnetic anisotropy constant, and when Co is dissolved in spinel, the crystal magnetic anisotropy constant becomes small and core loss is reduced. When CoO is less than 0.6% or more than 2.5% by mol, it becomes difficult to reduce core loss at a frequency of 5 MHz and an exciting magnetic flux density of 20 mT. In particular, when CoO is more than 2.5% by mol, not only core loss at low temperature increases but also the initial permeability μi largely decreases. The lower limit of the content of CoO is preferably 0.65% by mol, and more preferably 0.70% by mol. Further, the upper limit of the content of CoO is preferably 2.4% by mol, more preferably 2.3% by mol, and most preferably 2.0% by mol.

(e) NiO

The content of NiO is the balance of 100% by mol of the essential components minus the total amount of the above components, and is preferably 18.0% by mol or more. According to the present invention, the crystal magnetic anisotropy constant is adjusted by limiting the contents of Fe, Zn, Cu, Ni and Co constituting the sintered Ni ferrite body to specific ranges, which can provide reduced core loss in a wide temperature range typically at a frequency of 5 MHz and an excitation flux density of 20 mT.

(2) Optional Components

Sn dissolves in crystal grains as stable tetravalent ions to reduce the lattice strain, which reduces the saturation magnetostriction constant λs and the magnetic anisotropy constant K1, thereby suppressing core loss. When adding less than 4 parts by mass of Sn calculated as $SnO_2$, based on 100 parts by mass of the total amount of $Fe_2O_3$, ZnO, CuO, CoO and NiO, core loss of the sintered Ni ferrite body is reduced. However, when the content of Sn calculated as $SnO_2$ is 4 parts by mass or more, sintering is inhibited and core loss increases, thus, the preferable content of Sn calculated as $SnO_2$ is less than 4 parts by mass. The content of Sn calculated as $SnO_2$ is more preferably 2 parts by mass or less, and most preferably 1.5 parts by mass or less. Adding Sn in combination with Co can provide reduced core loss in a wide temperature range.

When containing Sn, which is an element that inhibits sintering, a small amount of Bi may be contained to improve the sinterability. B calculated as $Bi_2O_3$ is preferably 0.3 parts by mass or less, based on 100 parts by mass of the total amount of $Fe_2O_3$, ZnO, CuO, CoO and NiO in order to control the crystal grain size suitably after sintering.

(3) Other Components

The sintered Ni ferrite body of the present invention may contain other components as long as not preventing the effect of reducing core loss. For example, 0.1 parts by mass of Ca calculated as CaO and 0.1 parts by mass of Si calculated as $SiO_2$, based on 100 parts by mass of the total amount of $Fe_2O_3$, ZnO, CuO, CoO and NiO, may be contained. Ca and Si may be included in the sintered Ni ferrite body as inevitable impurities, or may be added so as to suppress the growth of crystal grains and increase the grain boundary resistance to increase the specific resistance of the sintered Ni ferrite body. Inevitable impurities such as Na, S, Cl, P, Mn, Cr, and B are preferably as small as possible, and their industrial permissible range is 0.05 parts by mass or less in total, based on 100 parts by mass of the total amount of $Fe_2O_3$, ZnO, CuO, CoO and NiO. Less than 0.03 parts by mass of the total amount is particularly preferable for reducing the loss.

The quantitative determination of the components constituting the sintered Ni ferrite body can be conducted by fluorescent X-ray analysis and ICP emission spectral analysis. Qualitative analysis of the contained elements is previously carried out by fluorescent X-ray analysis, and then each element is quantified by a calibration curve method comparing with a standard sample.

(B) Average crystal grain size

The average crystal grain size of the sintered Ni ferrite body is more than 2.5 μm and less than 5.5 μm. Dividing the magnetic domain by pulverizing the crystal grains provides the reduced loss due to the movement of magnetic domain walls, and densifying the crystal grains provides the suppressed residual loss due to the pinning action. However, when the average crystal grain size is 2.5 μm or less, the core loss change ratio Ps exceeds 185%, namely, it is difficult to obtain core loss having a small temperature dependency, and also the initial magnetic permeability μi decreases by forming a single magnetic domain, thereby the hysteresis loss increases. The lower limit of the average crystal grain size is preferably 3.0 μm. On the other hand, when the average crystal grain size is 5.5 μm or more, the residual loss due to magnetic domain wall resonance increases, and it is difficult to obtain the effect of reducing core loss at a high frequency of 5 MHz or more. The upper limit of the average crystal grain size is preferably 5.0 μm.

[2] Production Method of the Sintered Ni Ferrite Body

Powders of compounds (mainly oxides) of the respective elements constituting the sintered Ni ferrite body used as raw materials are wet mixed at a predetermined ratio, then dried to obtain raw material powder. The raw material powder is calcined at a temperature of 700° C. or higher and lower than the sintering temperature to promote spinelization to obtain a calcined body.

The calcining temperature lower than the sintering temperature is specifically 850° C. or less, and preferably 830° C. or less, because it takes longer to pulverizing the calcined body as the spinelization proceeds. On the other hand, when the calcining temperature is less than 700° C., the spinelization is too slow and the calcination time becomes too long, so it is necessary to be 700° C. or more. The calcining temperature is preferably 750° C. or higher. The calcined body may be composed of all the elements constituting the sintered Ni ferrite body, or composed only of Fe, Zn, Cu and Ni, which are the main elements of spinel, and added with Co and Sn at pulverizing the calcined body (post-added).

Since Co and Sn are small amounts, composition control and uniform dispersion of Co and Sn can be easily made by the post-addition.

The calcined body is wet-pulverized with ion-exchanged water in a ball mill to form a slurry. The pulverization of the calcined body is carried out until the pulverized powder has an average particle size (measured by an air permeation method) of preferably 0.5-1.5 μm, and more preferably 0.95-1.10 μm. The pulverization time is preferably 0.5-8 hours. When the pulverization time is less than 0.5 hours, a preferable pulverized particle size may not be obtained. When the pulverization time is more than 8 hours, contamination of impurities due to wear of members such as a pulverizing medium of a pulverization machine or a container may increase.

With polyvinyl alcohol added as a binder, the slurry is granulated by a spray dryer, and then compression-molded to a green body having a predetermined shape. The green body is sintered at a temperature of 900-1000° C. in a sintering furnace to obtain a sintered Ni ferrite body. The sintering step comprises a temperature-elevating step, a high-temperature-keeping step, and a cooling step. The atmosphere in the sintering step may be an inert gas atmosphere or an air atmosphere. In the high-temperature-keeping step, the maximum temperature is set to 900° C. to 1000° C. In the high-temperature-keeping step, it may or may not be held in a predetermined temperature range for a predetermined time. When the average pulverized particle size of the calcined powder is small, the sintering reaction activity is high, so densification is promoted from a low sintering temperature, the uniform and dense sintered Ni ferrite body having a small grain size can be obtained even in low-temperature sintering at 1000° C. or lower. When the sintering temperature is less than 900° C., sintering is insufficient, and the sintered Ni ferrite body may be insufficient in strength. On the other hand, when it is higher than 1000° C., sintering is excessive, making it difficult to obtain the desired grain size.

[3] Coil Device

The coil device of the present invention can be constituted by the above-mentioned sintered Ni ferrite body formed in a predetermined shape. The shape of the coil device is not limited, but is preferably annular.

The present invention will be explained in further detail by Examples below, without intention of restriction.

Examples 1-25 and Comparative Examples 1-18

$Fe_2O_3$ powder, ZnO powder, CuO powder, and NiO powder weighed so as to provide each sintered Ni ferrite body having the composition shown in Table 1, were wet-mixed, then dried, and calcined for 1 hour at the temperature shown in Table 2. Each obtained calcined body was pulverized with cobalt oxide ($Co_3O_4$) powder in the proportions shown in Table 1 and ion-exchanged water in a ball mill to obtain a slurry. The content of cobalt oxide ($Co_3O_4$) powder in Table 1 is represented in that calculated as CoO. A part of the obtained slurry was dried and its average pulverized particle size was evaluated by an air permeability method. With polyvinyl alcohol added as a binder, the remaining slurry was dried and granulated by a spray dryer, and compression-molded to a ring-shaped green body.

Each green body was sintered at the temperature shown in Table 2 to obtain an annular sintered Ni ferrite body having an outer diameter of 8 mm, an inner diameter of 4 mm and a thickness of 2 mm. "Sintering temperature" shown in Table 2 is a high-temperature-keeping temperature in the sintering step. The high-temperature-keeping time was 2 hours. The density, average crystal grain size, initial permeability pi, quality factor Q, Curie temperature Tc, core loss Pcv, and core loss change ratio Ps of each sintered Ni ferrite body were measured or calculated by the following methods.

(1) Density of Sintered Body

The density was calculated by a volume weight method from the dimensions and weight of the sintered Ni ferrite body. Density of the sintered body was evaluated with the threshold of 4.85 g/cm$^3$, and considered as "good" when 4.85 g/cm$^3$ or more. When the density of the sintered body is low, the mechanical strength is poor, likely resulting in chipping and cracking. Also, when the density of the sintered Ni ferrite body is too low, the sintered Ni ferrite body has pores. Thus, when applying a resin mold for use as a magnetic core, or when fixing to a substrate, etc. with an adhesive agent, the problem that deterioration of the properties is caused due to the difference in linear expansion coefficient between the resin impregnated in the pores and the ferrite, or the problem that the resin is deficient at the adhesion interface, resulting in insufficient adhesive strength.

(2) Average Crystal Grain Size

The sintered Ni ferrite body was thermally etched at a temperature 50° C. lower than the sintering temperature, and the scanning electron microscope (SEM) photographs (3000 times and 5000 times) of the surface were taken. The observation area of the SEM photograph was 33 μm×43 μm at 3000 times and 20 μm×26 μm at 5000 times. Three arbitrary straight lines of length L1 were drawn on the SEM photograph, the number N1 of crystal grains present on each straight line was counted, and a value of L1/N1 obtained by dividing length L1 by the number N1 of grains were calculated for each straight line, and the average crystal grain size was defined as dividing the sum of the value of L1/N1 by three. In addition, when the average crystal grain size is less than 2 μm, an SEM photograph of 5000 times was used, and when it is 2 μm or more, an SEM photograph of 3000 times was used.

(3) Initial Permeability μi

A conductor wire was wound 7-turn around the magnetic core made of the annular sintered Ni ferrite body to form a coil device. The inductance was measured at a frequency of 100 kHz and 5 MHz and a current of 1 mA at room temperature using an LCR meter (4285A manufactured by Agilent Technologies, Inc.). From the obtained inductance, the initial permeability μi was determined by the following formula (2). The initial permeability μi at 5 MHz is preferably 40 or more.

$$\mu i = (le \times L)/(\mu_0 \times Ae \times N^2) \qquad (2),$$

(Le: magnetic path length, L: inductance (H), $\mu_0$: permeability of vacuum=$4\pi \times 10^{-7}$ (H/m), Ae: cross section of magnetic core, and N: number of turns of wire).

(4) Quality Factor Q

Using the magnetic core made of the annular sintered Ni ferrite body, the quality factor Q was determined by the following formula (3) at a frequency of 5 MHz and 10 MHz and a current of 1 mA at room temperature using the same LCR meter as above.

$$Q = 2\pi f L/R \qquad (3),$$

(F: frequency, L: inductance (H), and R: resistance component of winding at high frequency).

(5) Curie Temperature Tc

It was calculated by the formula (4) described in Ferrite (Maruzen Co., Ltd., published on Nov. 30, 1986, 6th edition, 79 pages).

$$Tc=12.8[x-(\tfrac{2}{3})\times z]-358(°\,C.) \quad (4),$$

wherein x and z are represent % by mol of $Fe_2O_3$ and ZnO, respectively.

(6) Core Loss Pcv

A coil device having a 5-turn primary winding and a 5-turn secondary winding was produced by using the magnetic core made of the annular sintered Ni ferrite body. Using a B-H analyzer (SY-8232 available from Iwatsu Electric Co., Ltd.), (a) the core loss Pcv (kW/m$^3$) was measured at temperatures of 20° C., 100° C. and 120° C., respectively, at a frequency of 5 MHz and a maximum magnetic flux density of 10 mT, and (b) core loss Pcv (kW/m$^3$) was measured at temperatures of 0° C., 20° C., 40° C., 60° C., 80° C., 100° C. and 120° C., respectively, at a frequency of 5 MHz and a maximum magnetic flux density of mT. When the core loss Pcv20 at 20° C. is 1800 kW/m$^3$ or less and the core loss Pcv 100 at 100° C. is 3000 kW/m$^3$ or less at a frequency of 5 MHz and an exciting magnetic flux density of 20 mT, it was considered as "good."

(7) Core Loss Change Ratio Ps

From the core loss measured in the preceding paragraph, core loss change ratio Ps was calculated by the following formula (5):

$$Ps(\%)=[(Pcv100-Pcv20)/Pcv20]\times 100 \quad (5),$$

wherein Pcv20 is core loss at 20° C. at a frequency of 5 MHz and an excitation flux density of 20 mT, and Pcv100 is core loss at 100° C. at a frequency of 5 MHz and an excitation flux density of 20 mT. In order to evaluate whether or not core loss is stable depending on temperature, the core loss change ratio Ps is used. When the core loss change ratio Ps is 185% or less, temperature stability of core loss was considered as "good."

Figure 1:
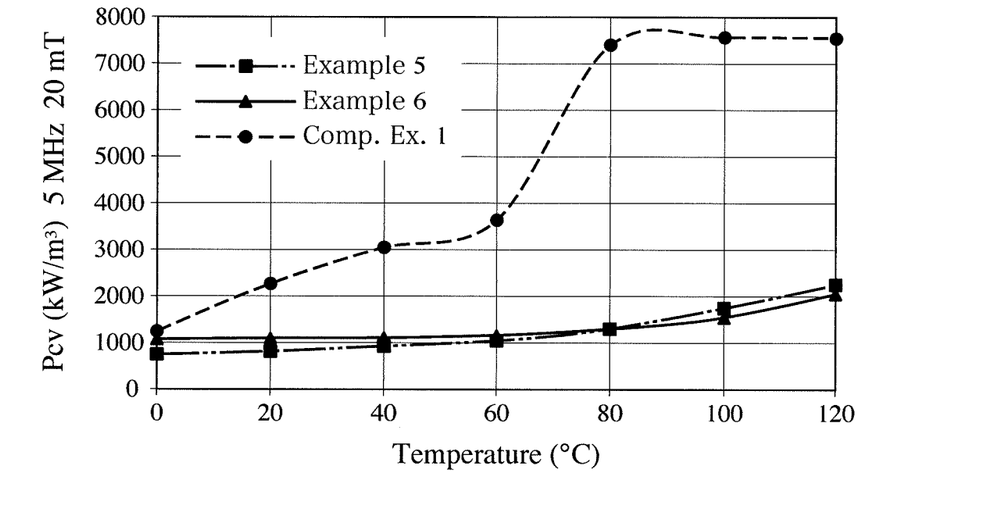
FIG. 1 is a graph showing the temperature characteristics of core loss for the magnetic cores of Examples 5, 6 and Comparative Example 1.

The composition of each sintered Ni ferrite body is shown in Table 1, the production conditions are shown in Table 2, the properties (average crystal grain size, density, Curie temperature, initial permeability, and quality factor) are shown in Table 3, and the temperature dependencies of core loss are shown in Table 4. Further, FIG. 1 shows the temperature dependencies of core loss of Examples 5, 6 and Comparative Example 1 at a frequency of 5 MHz and an exciting magnetic flux density of 20 mT.

TABLE 1

| Sample No. | Composition (% by mol) | | | | |
|---|---|---|---|---|---|
| | $Fe_2O_3$ | ZnO | CuO | CoO | NiO |
| Comp. Ex. 1 | 48.4 | 23.6 | 5.9 | 1.7 | Bal. |
| Comp. Ex. 2 | 48.5 | 25.0 | 8.8 | 0.0 | Bal. |
| Comp. Ex. 3 | 48.1 | 19.8 | 8.8 | 0.8 | Bal. |
| Comp. Ex. 4 | 47.4 | 19.7 | 8.8 | 1.5 | Bal. |
| Comp. Ex. 5 | 48.1 | 24.8 | 8.7 | 0.8 | Bal. |
| Comp. Ex. 6 | 47.7 | 24.6 | 8.7 | 1.6 | Bal. |
| Comp. Ex. 7 | 47.4 | 24.4 | 8.6 | 2.3 | Bal. |
| Comp. Ex. 8 | 48.5 | 15.0 | 8.8 | 0.0 | Bal. |
| Example 1 | 48.1 | 14.9 | 8.7 | 0.8 | Bal. |
| Example 2 | 47.8 | 14.8 | 8.7 | 1.5 | Bal. |
| Example 3 | 47.4 | 14.8 | 8.6 | 2.3 | Bal. |
| Comp. Ex. 9 | 46.3 | 14.3 | 8.4 | 4.5 | Bal. |
| Example 4 | 48.1 | 19.8 | 8.7 | 0.8 | Bal. |
| Example 5 | 47.8 | 19.7 | 8.7 | 1.6 | Bal. |
| Example 6 | 47.4 | 19.5 | 8.6 | 2.3 | Bal. |
| Comp. Ex. 10 | 46.3 | 19.1 | 8.4 | 4.5 | Bal. |
| Comp. Ex. 11 | 47.7 | 24.6 | 8.7 | 0.5 | Bal. |
| Example 7 | 47.4 | 24.4 | 8.6 | 0.7 | Bal. |
| Example 8 | 47.8 | 14.8 | 8.7 | 1.5 | Bal. |
| Comp. Ex. 12 | 46.3 | 14.3 | 8.4 | 4.5 | Bal. |
| Example 9 | 47.8 | 19.7 | 8.7 | 1.5 | Bal. |
| Comp. Ex. 13 | 46.3 | 19.1 | 8.4 | 4.5 | Bal. |
| Example 10 | 47.3 | 19.7 | 8.7 | 1.5 | Bal. |
| Example 11 | 47.8 | 19.7 | 8.7 | 1.5 | Bal. |
| Example 12 | 48.2 | 19.7 | 8.7 | 1.6 | Bal. |
| Example 13 | 47.8 | 17.7 | 8.7 | 1.5 | Bal. |
| Example 14 | 47.7 | 20.7 | 8.7 | 1.5 | Bal. |
| Example 15 | 47.7 | 21.7 | 8.7 | 1.5 | Bal. |
| Example 16 | 47.3 | 17.7 | 8.7 | 1.5 | Bal. |
| Example 17 | 47.3 | 18.7 | 8.7 | 1.5 | Bal. |
| Example 18 | 47.3 | 21.7 | 8.7 | 1.5 | Bal. |
| Example 19 | 48.2 | 17.7 | 8.7 | 1.5 | Bal. |
| Example 20 | 48.2 | 20.7 | 8.7 | 1.6 | Bal. |
| Example 21 | 48.2 | 21.7 | 8.7 | 1.6 | Bal. |
| Comp. Ex. 14 | 48.5 | 20.0 | 8.8 | 0.0 | Bal. |
| Comp. Ex. 15 | 47.7 | 24.6 | 8.7 | 1.6 | Bal. |
| Example 22 | 47.8 | 19.7 | 8.3 | 1.5 | Bal. |
| Example 23 | 47.7 | 19.7 | 9.9 | 1.5 | Bal. |
| Comp. Ex. 16 | 48.4 | 20.0 | 8.8 | 0.2 | Bal. |
| Comp. Ex. 17 | 48.3 | 19.9 | 8.8 | 0.5 | Bal. |
| Comp. Ex. 18 | 48.2 | 19.9 | 8.7 | 0.6 | Bal. |
| Example 24 | 48.1 | 19.8 | 8.7 | 0.8 | Bal. |
| Example 25 | 47.8 | 19.7 | 8.7 | 1.5 | Bal. |

TABLE 2

| Sample No. | Production Conditions | | | |
|---|---|---|---|---|
| | Calcining Temp. (° C.) | Pulverizing Time (hours) | Pulverized Particle Size (μm) | Sintering Temp. (° C.) |
| Comp. Ex. 1 | 800 | 4.0 | 1.45 | 1030 |
| Comp. Ex. 2 | 800 | 4.0 | 0.90 | 925 |
| Comp. Ex. 3 | 800 | 4.0 | 0.99 | 900 |
| Comp. Ex. 4 | 800 | 4.0 | 0.97 | 900 |
| Comp. Ex. 5 | 800 | 4.0 | 1.02 | 900 |
| Comp. Ex. 6 | 800 | 4.0 | 1.01 | 900 |
| Comp. Ex. 7 | 800 | 4.0 | 1.00 | 900 |
| Comp. Ex. 8 | 800 | 4.0 | 1.00 | 950 |
| Example 1 | 800 | 4.0 | 0.97 | 950 |
| Example 2 | 800 | 4.0 | 1.01 | 950 |
| Example 3 | 800 | 4.0 | 0.99 | 950 |
| Comp. Ex. 9 | 800 | 4.0 | 0.98 | 950 |
| Example 4 | 800 | 4.0 | 0.99 | 950 |
| Example 5 | 800 | 4.0 | 0.97 | 950 |
| Example 6 | 800 | 4.0 | 1.01 | 950 |
| Comp. Ex. 10 | 800 | 4.0 | 0.98 | 950 |
| Comp. Ex. 11 | 800 | 4.0 | 1.01 | 950 |
| Example 7 | 800 | 4.0 | 1.00 | 950 |
| Example 8 | 800 | 4.0 | 1.01 | 1000 |
| Comp. Ex. 12 | 800 | 4.0 | 0.98 | 1000 |
| Example 9 | 800 | 4.0 | 0.97 | 1000 |
| Comp. Ex. 13 | 800 | 4.0 | 0.98 | 1000 |
| Example 10 | 800 | 4.0 | 1.09 | 950 |
| Example 11 | 800 | 4.0 | 1.17 | 950 |
| Example 12 | 800 | 4.0 | 1.17 | 950 |
| Example 13 | 800 | 4.0 | 1.13 | 950 |
| Example 14 | 800 | 4.0 | 1.17 | 950 |
| Example 15 | 800 | 4.0 | 1.07 | 950 |
| Example 16 | 800 | 4.0 | 1.04 | 950 |
| Example 17 | 800 | 4.0 | 0.99 | 950 |
| Example 18 | 800 | 4.0 | 1.09 | 950 |
| Example 19 | 800 | 4.0 | 1.08 | 950 |
| Example 20 | 800 | 4.0 | 1.08 | 950 |
| Example 21 | 800 | 4.0 | 1.07 | 950 |
| Comp. Ex. 14 | 800 | 4.0 | 1.10 | 950 |
| Comp. Ex. 15 | 800 | 4.0 | 1.01 | 1000 |

TABLE 2-continued

| | Production Conditions | | | |
|---|---|---|---|---|
| Sample No. | Calcining Temp. (° C.) | Pulverizing Time (hours) | Pulverized Particle Size (μm) | Sintering Temp. (° C.) |
| Example 22 | 800 | 4.0 | 0.98 | 950 |
| Example 23 | 800 | 4.0 | 1.00 | 950 |
| Comp. Ex. 16 | 800 | 4.0 | 1.10 | 950 |
| Comp. Ex. 17 | 800 | 4.0 | 1.10 | 950 |
| Comp. Ex. 18 | 800 | 4.0 | 1.10 | 950 |
| Example 24 | 800 | 4.0 | 1.10 | 950 |
| Example 25 | 800 | 4.0 | 1.10 | 950 |

TABLE 3

| | Properties | | | | | | |
|---|---|---|---|---|---|---|---|
| | Dav[1] | Density[2] | Tc[3] | μi[4] | | Q[5] | |
| Sample No. | (μm) | (g/cm$^3$) | (° C.) | 100 kHz | 5 MHz | 5 MHz | 10 MHz |
| Comp. Ex. 1 | 5.50 | 5.10 | 273 | 120 | —[6] | 82 | 56 |
| Comp. Ex. 2 | 1.80 | 5.26 | 250 | 280 | —[6] | —[6] | —[6] |
| Comp. Ex. 3 | 0.99 | 4.77 | 351 | 79 | 76 | 138 | 98 |
| Comp. Ex. 4 | 1.30 | 4.81 | 352 | 64 | 61 | 105 | 83 |
| Comp. Ex. 5 | 0.88 | 4.77 | 251 | 125 | 123 | 122 | 73 |
| Comp. Ex. 6 | 0.86 | 4.77 | 252 | 98 | 94 | 103 | 75 |
| Comp. Ex. 7 | 0.93 | 4.76 | 254 | 79 | 76 | 84 | 69 |
| Comp. Ex. 8 | 2.99 | 5.18 | 450 | 146 | 146 | 102 | 18 |
| Example 1 | 2.52 | 5.18 | 451 | 71 | 68 | 137 | 101 |
| Example 2 | 2.56 | 5.18 | 451 | 58 | 55 | 102 | 83 |
| Example 3 | 2.51 | 5.17 | 452 | 47 | 43 | 84 | 72 |
| Comp. Ex. 9 | 1.93 | 5.14 | 454 | 21 | 19 | 65 | 58 |
| Example 4 | 3.16 | 5.18 | 351 | 104 | 102 | 131 | 85 |
| Example 5 | 3.00 | 5.20 | 352 | 83 | 80 | 107 | 82 |
| Example 6 | 2.80 | 5.18 | 353 | 67 | 64 | 91 | 74 |
| Comp. Ex. 10 | 2.46 | 5.15 | 356 | 34 | 31 | 67 | 60 |
| Comp. Ex. 11 | 2.25 | 5.13 | 252 | 117 | 114 | 101 | 68 |
| Example 7 | 2.82 | 5.13 | 254 | 88 | 85 | 92 | 72 |
| Example 8 | 4.96 | 5.25 | 451 | 64 | 60 | 105 | 84 |
| Comp. Ex. 12 | 4.40 | 5.23 | 454 | 22 | 19 | 68 | 61 |
| Example 9 | 3.70 | 5.24 | 352 | 91 | 88 | 106 | 80 |
| Comp. Ex. 13 | 4.95 | 5.21 | 356 | 35 | 32 | 71 | 63 |
| Example 10 | 3.21 | 5.13 | 352 | 76 | 75 | 121 | 103 |
| Example 11 | 3.26 | 5.11 | 352 | 80 | 79 | 114 | 98 |
| Example 12 | 3.29 | 5.14 | 352 | 82 | 81 | 114 | 97 |
| Example 13 | 3.23 | 5.13 | 392 | 68 | 67 | 114 | 100 |
| Example 14 | 3.03 | 5.16 | 332 | 86 | 85 | 117 | 100 |
| Example 15 | 3.15 | 5.14 | 312 | 91 | 90 | 115 | 96 |
| Example 16 | 3.06 | 5.30 | 392 | 74 | 73 | 114 | 100 |
| Example 17 | 3.02 | 5.24 | 372 | 78 | 77 | 115 | 100 |
| Example 18 | 3.00 | 5.19 | 312 | 96 | 95 | 116 | 94 |
| Example 19 | 3.33 | 5.21 | 392 | 78 | 76 | 110 | 96 |
| Example 20 | 3.42 | 5.22 | 332 | 98 | 96 | 110 | 93 |
| Example 21 | 3.35 | 5.20 | 312 | 103 | 102 | 110 | 87 |
| Comp. Ex. 14 | 3.84 | 5.13 | 350 | 223 | 238 | 42 | 3 |
| Comp. Ex. 15 | 5.52 | 5.21 | 252 | 130 | 127 | 98 | 63 |
| Example 22 | 3.99 | 5.14 | 352 | 81 | 80 | 111 | 98 |
| Example 23 | 4.55 | 5.15 | 352 | 88 | 87 | 111 | 88 |
| Comp. Ex. 16 | 4.31 | 5.22 | 350 | 161 | 163 | 134 | 42 |
| Comp. Ex. 17 | 3.83 | 5.15 | 351 | 119 | 119 | 155 | 106 |
| Comp. Ex. 18 | 3.59 | 5.15 | 351 | 110 | 110 | 148 | 107 |
| Example 24 | 4.36 | 5.13 | 351 | 101 | 101 | 143 | 107 |
| Example 25 | 4.24 | 5.15 | 352 | 83 | 82 | 111 | 95 |

Note:
[1]Average crystal grain size
[2]Density of sintered body
[3]Curie temperature
[4]Initial permeability
[5]Quality factor
[6]Not measured

TABLE 4

| Sample No. | Core Loss (5 MHz and 10 mT) | | |
|---|---|---|---|
| | 20° C. | 100° C. | 120° C. |
| Comp. Ex. 1 | 99 | 310 | 816 |
| Comp. Ex. 2 | 319 | 431 | 492 |
| Comp. Ex. 3 | 60 | 169 | 227 |
| Comp. Ex. 4 | 163 | 217 | 272 |
| Comp. Ex. 5 | 96 | 186 | 261 |
| Comp. Ex. 6 | 86 | 144 | 206 |
| Comp. Ex. 7 | 142 | 165 | 219 |
| Comp. Ex. 8 | 512 | 557 | 573 |
| Example 1 | 56 | 124 | 170 |
| Example 2 | 103 | 168 | 226 |
| Example 3 | 394 | 389 | 460 |
| Comp. Ex. 9 | 1145 | 842 | 992 |
| Example 4 | 44 | 123 | 180 |
| Example 5 | 66 | 113 | 156 |
| Example 6 | 114 | 147 | 192 |
| Comp. Ex. 10 | 687 | 494 | 587 |
| Comp. Ex. 11 | 97 | 185 | 355 |
| Example 7 | 147 | 174 | 287 |
| Example 8 | 99 | 159 | 213 |
| Comp. Ex. 12 | 1098 | 744 | 876 |
| Example 9 | 62 | 119 | 175 |

| Sample No. | Core Loss (5 MHz and 20 mT) | | | | | | | Ps (%) |
|---|---|---|---|---|---|---|---|---|
| | 0° C. | 20° C. | 40° C. | 60° C. | 80° C. | 100° C. | 120° C. | |
| Comp. Ex. 1 | 1239 | 2260 | 3039 | 3649 | 7403 | 7563 | 7546 | 235 |
| Comp. Ex. 2 | 2025 | 2054 | 2157 | 2267 | 2408 | 2609 | 2912 | 27 |
| Comp. Ex. 3 | 1020 | 1162 | 1327 | 1613 | 1909 | 2334 | 2597 | 101 |
| Comp. Ex. 4 | 979 | 1053 | 1139 | 1295 | 1646 | 1857 | 2261 | 76 |
| Comp. Ex. 5 | 900 | 1030 | 1330 | 1317 | 1673 | 2093 | 2506 | 103 |
| Comp. Ex. 6 | 1799 | 859 | 965 | 1092 | 1339 | 1723 | 2299 | 101 |
| Comp. Ex. 7 | 988 | 1109 | 1251 | 1259 | 1418 | 1813 | 2300 | 63 |
| Comp. Ex. 8 | 3887 | 3957 | 3801 | 3897 | 3996 | 4100 | 4222 | 4 |
| Example 1 | 953 | 1281 | 1437 | 1960 | 2050 | 2157 | 2418 | 68 |
| Example 2 | 1083 | 1105 | 1142 | 1377 | 1709 | 2155 | 2108 | 95 |
| Example 3 | 1592 | 1602 | 1523 | 1516 | 1582 | 1882 | 2416 | 17 |
| Comp. Ex. 9 | 2583 | 4256 | 3797 | 3448 | 3266 | 3532 | 4324 | −17 |
| Example 4 | 756 | 1172 | 1201 | 1449 | 1850 | 2157 | 2604 | 84 |
| Example 5 | 738 | 814 | 935 | 1046 | 1309 | 1755 | 2254 | 115 |
| Example 6 | 1073 | 1094 | 1110 | 1163 | 1303 | 1557 | 2052 | 42 |
| Comp. Ex. 10 | 2159 | 2760 | 2573 | 2259 | 2134 | 2348 | 2992 | −15 |
| Comp. Ex. 11 | 1275 | 878 | 1148 | 1618 | 2330 | 2994 | 4098 | 241 |
| Example 7 | 1236 | 1116 | 1319 | 1491 | 2134 | 2902 | 3819 | 160 |
| Example 8 | 1356 | 1149 | 1445 | 1655 | 2763 | 2739 | 3113 | 138 |
| Comp. Ex. 12 | 2468 | 4298 | 3917 | 3269 | 2971 | 3415 | 3962 | −21 |
| Example 9 | 718 | 887 | 1133 | 1445 | 1957 | 2481 | 3010 | 180 |

| Sample No. | Core Loss (5 MHz and 10 mT) | | |
|---|---|---|---|
| | 20° C. | 100° C. | 120° C. |
| Comp. Ex. 13 | 654 | 447 | 521 |
| Example 10 | 53 | 101 | 133 |
| Example 11 | 53 | 99 | 137 |
| Example 12 | 65 | 99 | 137 |
| Example 13 | 65 | 115 | 158 |
| Example 14 | 48 | 94 | 132 |
| Example 15 | 46 | 95 | 139 |
| Example 16 | 61 | 107 | 146 |
| Example 17 | 55 | 100 | 137 |
| Example 18 | 49 | 99 | 146 |
| Example 19 | 66 | 112 | 146 |
| Example 20 | 47 | 89 | 126 |
| Example 21 | 47 | 91 | 133 |
| Comp. Ex. 14 | 567 | 895 | 1085 |
| Comp. Ex. 15 | 85 | 444 | 782 |
| Example 22 | 38 | 123 | 164 |
| Example 23 | 35 | 118 | 164 |
| Comp. Ex. 16 | 169 | 538 | 673 |
| Comp. Ex. 17 | 34 | 226 | 332 |
| Comp. Ex. 18 | 23 | 165 | 252 |
| Example 24 | 18 | 133 | 202 |
| Example 25 | 35 | 112 | 149 |

TABLE 4-continued

| Sample No. | Core Loss (5 MHz and 20 mT) | | | | | | | Ps (%) |
|---|---|---|---|---|---|---|---|---|
| | 0° C. | 20° C. | 40° C. | 60° C. | 80° C. | 100° C. | 120° C. | |
| Comp. Ex. 13 | 2298 | 2677 | 2570 | 2160 | 2064 | 2315 | 2970 | −14 |
| Example 10 | 690 | 757 | 821 | 927 | 1061 | 1312 | 1698 | 73 |
| Example 11 | 670 | 731 | 794 | 908 | 1089 | 1343 | 1774 | 84 |
| Example 12 | 646 | 749 | 851 | 991 | 1187 | 1440 | 1862 | 92 |
| Example 13 | 814 | 864 | 909 | 996 | 1140 | 1361 | 1706 | 58 |
| Example 14 | 610 | 683 | 767 | 870 | 1050 | 1357 | 1812 | 99 |
| Example 15 | 586 | 680 | 763 | 912 | 1171 | 1552 | 2133 | 128 |
| Example 16 | 753 | 802 | 840 | 911 | 1073 | 1333 | 1590 | 66 |
| Example 17 | 698 | 759 | 804 | 894 | 1059 | 1285 | 1655 | 69 |
| Example 18 | 589 | 683 | 799 | 955 | 1242 | 1622 | 2127 | 138 |
| Example 19 | 727 | 787 | 897 | 1029 | 1211 | 1478 | 1756 | 88 |
| Example 20 | 543 | 641 | 827 | 989 | 1160 | 1422 | 1903 | 122 |
| Example 21 | 537 | 616 | 720 | 876 | 1193 | 1579 | 2211 | 156 |
| Comp. Ex. 14 | 4007 | 4177 | 4327 | 4542 | 4843 | 5121 | 5400 | 23 |
| Comp. Ex. 15 | 1409 | 1333 | 2570 | 2900 | 3914 | 4771 | 5881 | 258 |
| Example 22 | 800 | 890 | 1219 | 1688 | 1827 | 1911 | 2304 | 115 |
| Example 23 | 691 | 831 | 1219 | 1790 | 2051 | 2265 | 2880 | 173 |
| Comp. Ex. 16 | 2841 | 2988 | 3112 | 3345 | 3654 | 4098 | 4486 | 37 |
| Comp. Ex. 17 | 1644 | 2162 | 2513 | 2552 | 2950 | 3104 | 3573 | 44 |
| Comp. Ex. 18 | 1203 | 1931 | 2132 | 2442 | 2506 | 2818 | 3256 | 46 |
| Example 24 | 944 | 1557 | 2137 | 2217 | 2429 | 2622 | 3053 | 68 |
| Example 25 | 727 | 848 | 1219 | 1705 | 1865 | 1970 | 2400 | 132 |

As is clear from Table 4, the sintered Ni ferrite body of the present invention exhibited low core loss in a wide temperature range. On the other hand, although the sintered Ni ferrite bodies of Comparative Examples 3-7 have low core loss, density of the sintered body was low as less than 4.85 g/cm³.

As a result of counting the number of crystal grains having a maximum diameter of 10 μm or more surrounded by grain boundaries in a SEM photograph of 3000 times (observed area: 33 μm×43 μm) for a sample of each sintered Ni ferrite body obtained by thermal etching at a temperature 50° C. lower than the sintering temperature, the number of crystal grains in the sintered Ni ferrite bodies of any of the examples was 10 or less.

Examples 26-33 and Comparative Examples 19-23

Fe₂O₃ powder, ZnO powder, CuO powder, and NiO powder weighed so as to provide a sintered Ni ferrite body having the composition shown in Table 5, were wet-mixed in the same manner as in Example 1, then dried, and calcined for 1 hour at 800° C. Each obtained calcined body was pulverized with cobalt oxide (Co₃O₄) powder, tin oxide (SnO₂) powder both in the proportions shown in Table 5 and ion-exchanged water in a ball mill to obtain a slurry. The content of cobalt oxide (Co₃O₄) powder in Table 5 is represented in that calculated as CoO. A part of the slurry was dried and its average pulverized particle size was evaluated by an air permeability method. With polyvinyl alcohol added as a binder, the remaining slurry was dried and granulated by a spray dryer, and compression-molded to a ring-shaped green body.

Each green body was sintered at 950° C. to obtain an annular sintered Ni ferrite body having an outer diameter of 8 mm, an inner diameter of 4 mm and a thickness of 2 mm. The keeping time in the high-temperature-keeping step was 2 hours. The density, average crystal grain size, initial permeability μi, quality factor Q, Curie temperature Tc, core loss Pcv, and core loss change ratio Ps of each sintered Ni ferrite body were measured or calculated by the same method as in Example 1.

The composition of each sintered Ni ferrite body is shown in Table 5, the production conditions are shown in Table 6, the properties (average crystal grain size, density, Curie temperature, initial permeability, and quality factor) are shown in Table 7, and the temperature dependencies of core loss are shown in Table 8. "Sintering temperature" shown in Table 6 is a high-temperature-keeping temperature in the sintering step.

TABLE 5

| | Composition | | | | | |
|---|---|---|---|---|---|---|
| | % by mol | | | | | parts by mass |
| Sample No. | Fe₂O₃ | ZnO | CuO | CoO | NiO | SnO₂ |
| Comp. Ex. 19 | 48.5 | 20.0 | 8.8 | 0.0 | Bal. | 1.00 |
| Comp. Ex. 20 | 48.5 | 20.0 | 8.8 | 0.0 | Bal. | 2.00 |
| Comp. Ex. 21 | 48.5 | 20.0 | 8.8 | 0.0 | Bal. | 4.00 |
| Example 26 | 48.1 | 19.8 | 8.7 | 0.8 | Bal. | 0.25 |
| Example 27 | 48.1 | 19.8 | 8.7 | 0.8 | Bal. | 0.50 |
| Example 28 | 48.1 | 19.8 | 8.7 | 0.8 | Bal. | 1.00 |
| Example 29 | 48.1 | 19.8 | 8.7 | 0.8 | Bal. | 2.00 |
| Comp. Ex. 22 | 48.1 | 19.8 | 8.7 | 0.8 | Bal. | 4.00 |
| Example 30 | 47.8 | 19.7 | 8.7 | 1.5 | Bal. | 0.25 |
| Example 31 | 47.8 | 19.7 | 8.7 | 1.5 | Bal. | 0.50 |
| Example 32 | 47.8 | 19.7 | 8.7 | 1.5 | Bal. | 1.00 |
| Example 33 | 47.8 | 19.7 | 8.7 | 1.5 | Bal. | 2.00 |
| Comp. Ex. 23 | 47.8 | 19.7 | 8.7 | 1.5 | Bal. | 4.00 |

TABLE 6

| | Production Conditions | | | |
|---|---|---|---|---|
| Sample No. | Calcining Temp. (° C.) | Pulverizing Time (hours) | Pulverized Particle Size (μm) | Sintering Temp. (° C.) |
| Comp. Ex. 19 | 800 | 4.0 | 1.10 | 950 |
| Comp. Ex. 20 | 800 | 4.0 | 1.10 | 950 |
| Comp. Ex. 21 | 800 | 4.0 | 1.10 | 950 |
| Example 26 | 800 | 4.0 | 1.10 | 950 |
| Example 27 | 800 | 4.0 | 1.10 | 950 |

TABLE 6-continued

| Sample No. | Calcining Temp. (° C.) | Pulverizing Time (hours) | Pulverized Particle Size (μm) | Sintering Temp. (° C.) |
|---|---|---|---|---|
| Example 28 | 800 | 4.0 | 1.10 | 950 |
| Example 29 | 800 | 4.0 | 1.10 | 950 |
| Comp. Ex. 22 | 800 | 4.0 | 1.10 | 950 |
| Example 30 | 800 | 4.0 | 1.10 | 950 |
| Example 31 | 800 | 4.0 | 1.10 | 950 |
| Example 32 | 800 | 4.0 | 1.10 | 950 |
| Example 33 | 800 | 4.0 | 1.10 | 950 |
| Comp. Ex. 23 | 800 | 4.0 | 1.10 | 950 |

TABLE 7

| | Properties | | | | | | |
|---|---|---|---|---|---|---|---|
| | $Dav^{(1)}$ | $Density^{(2)}$ | $Tc^{(3)}$ | $\mu i^{(4)}$ | | $Q^{(5)}$ | |
| Sample No. | (μm) | (g/cm³) | (° C.) | 100 kHz | 5 MHz | 5 MHz | 10 MHz |
| Comp. Ex. 19 | 3.70 | 5.11 | 350 | 173 | 177 | 74 | 8 |
| Comp. Ex. 20 | 1.36 | 4.99 | 350 | 114 | 114 | 108 | 46 |
| Comp. Ex. 21 | 0.68 | 4.46 | 350 | 57 | 56 | 88 | 74 |
| Example 26 | 4.15 | 5.15 | 351 | 99 | 99 | 145 | 111 |
| Example 27 | 4.13 | 5.17 | 351 | 95 | 94 | 147 | 113 |
| Example 28 | 4.24 | 5.15 | 351 | 88 | 87 | 151 | 117 |
| Example 29 | 2.51 | 5.03 | 351 | 71 | 70 | 159 | 121 |
| Comp. Ex. 22 | 0.68 | 4.55 | 351 | 52 | 51 | 99 | 81 |
| Example 30 | 3.69 | 5.17 | 352 | 79 | 78 | 115 | 98 |
| Example 31 | 3.69 | 5.18 | 352 | 73 | 72 | 118 | 100 |
| Example 32 | 3.50 | 5.12 | 352 | 63 | 62 | 121 | 103 |
| Example 33 | 3.24 | 5.09 | 352 | 58 | 57 | 127 | 107 |
| Comp. Ex. 23 | 0.72 | 4.54 | 352 | 43 | 42 | 123 | 97 |

Note:
[1] Average crystal grain size
[2] Density of sintered body
[3] Curie temperature
[4] Initial permeability
[5] Quality factor

TABLE 8

| | Core Loss (5 MHz and 10 mT) | | |
|---|---|---|---|
| Sample No. | 20° C. | 100° C. | 120° C. |
| Comp. Ex. 19 | 362 | 465 | 498 |
| Comp. Ex. 20 | 309 | 353 | 356 |
| Comp. Ex. 21 | 682 | 869 | 895 |
| Example 26 | 15 | 125 | 176 |
| Example 27 | 21 | 114 | 167 |
| Example 28 | 39 | 127 | 171 |
| Example 29 | 67 | 174 | 224 |
| Comp. Ex. 22 | 696 | 865 | 908 |
| Example 30 | 32 | 108 | 150 |
| Example 31 | 33 | 111 | 155 |
| Example 32 | 37 | 193 | 184 |
| Example 33 | 77 | 169 | 217 |
| Comp. Ex. 23 | 845 | 992 | 1003 |

| | Core Loss (5 MHz and 20 mT) | | | | | | | Ps |
|---|---|---|---|---|---|---|---|---|
| Sample No. | 0° C. | 20° C. | 40° C. | 60° C. | 80° C. | 100° C. | 120° C. | (%) |
| Comp. Ex. 19 | 2710 | 2725 | 2774 | 2876 | 3002 | 3195 | 3334 | 17 |
| Comp. Ex. 20 | 2553 | 2567 | 2599 | 2635 | 2687 | 2738 | 2839 | 7 |
| Comp. Ex. 21 | 4467 | 4627 | 4756 | 4899 | 5023 | 5291 | 5490 | 14 |
| Example 26 | 778 | 1248 | 1873 | 1999 | 1907 | 2235 | 2578 | 79 |
| Example 27 | 754 | 1028 | 1278 | 1592 | 1778 | 2006 | 2373 | 95 |
| Example 28 | 816 | 1066 | 1443 | 1530 | 1770 | 1919 | 2251 | 80 |
| Example 29 | 1232 | 1330 | 1540 | 1740 | 1994 | 2278 | 2634 | 71 |
| Comp. Ex. 22 | 4407 | 4574 | 4762 | 4961 | 5511 | 5415 | 5630 | 18 |
| Example 30 | 761 | 882 | 1199 | 1651 | 1802 | 1974 | 2187 | 124 |
| Example 31 | 819 | 896 | 989 | 1111 | 1303 | 1622 | 2038 | 81 |
| Example 32 | 1004 | 1130 | 1235 | 1324 | 1794 | 2160 | 2330 | 91 |

TABLE 8-continued

| | | | | | | | | |
|---|---|---|---|---|---|---|---|---|
| Example 33 | 1366 | 1536 | 1625 | 1680 | 1811 | 2185 | 2581 | 42 |
| Comp. Ex. 23 | —[(1)] | —[(1)] | 5470 | 5729 | 5965 | 6161 | 6404 | — |

Note:
[(1)]Nod measured

As is clear from Table 8, the sintered Ni ferrite body of the present invention exhibited low core loss in a wide temperature range. In addition, as a result of counting the number of crystal grains having a maximum diameter of 10 μm or more surrounded by grain boundaries in a SEM photograph of 3000 times (observed area: 33 μm×43 μm) for a sample of each sintered Ni ferrite body obtained by thermal etching at a temperature 50° C. lower than the sintering temperature, the number of crystal grains in the sintered Ni ferrite bodies of any of the examples was 10 or less. Moreover, while the amount of Sn increased to 4 parts by mass, the minimum value of core loss appeared.

Examples 34-40 and Comparative Examples 24 and 25

$Fe_2O_3$ powder, ZnO powder, CuO powder, and NiO powder weighed so as to provide a sintered Ni ferrite body having the composition shown in Table 9, were wet-mixed in the same manner as in Example 1, then dried, and calcined for 1.5 hours at 700-800° C. Each obtained calcined body was pulverized with cobalt oxide ($Co_3O_4$) powder in the proportions shown in Table 9 and ion-exchanged water in a ball mill to obtain a slurry. The content of cobalt oxide ($Co_3O_4$) powder in Table 9 is represented in that calculated as CoO. A part of the slurry was dried and its average pulverized particle size was evaluated by an air permeability method. With polyvinyl alcohol added as a binder, the remaining slurry was dried and granulated by a spray dryer, and compression-molded to a ring-shaped green body.

Each green body was sintered at 900-1000° C. to obtain an annular sintered Ni ferrite body having an outer diameter of 8 mm, an inner diameter of 4 mm and a thickness of 2 mm. The keeping time in the high-temperature-keeping step was 1.5 hours. The density, average crystal grain size, initial permeability gi, quality factor Q, Curie temperature Tc, core loss Pcv, and core loss change ratio Ps of each sintered Ni ferrite body were measured or calculated by the same method as in Example 1.

The composition of each sintered Ni ferrite body is shown in Table 9, the production conditions are shown in Table 10, the properties (average crystal grain size, density, Curie temperature, initial permeability, and quality factor) are shown in Table 11, and the temperature dependencies of core loss are shown in Table 12. "Sintering temperature" shown in Table 10 is a high-temperature-keeping temperature in the sintering step.

TABLE 9

| | Composition (% by mol) | | | | |
|---|---|---|---|---|---|
| Sample No. | $Fe_2O_3$ | ZnO | CuO | CoO | NiO |
| Example 34 | 47.8 | 19.7 | 8.7 | 1.5 | Bal. |
| Comp. Ex. 24 | 47.8 | 19.7 | 8.7 | 1.5 | Bal. |
| Example 35 | 47.8 | 19.7 | 8.7 | 1.5 | Bal. |
| Comp. Ex. 25 | 47.8 | 19.7 | 8.7 | 1.5 | Bal. |
| Example 36 | 47.8 | 19.7 | 8.7 | 1.5 | Bal. |
| Example 37 | 47.8 | 19.7 | 8.7 | 1.5 | Bal. |
| Example 38 | 47.8 | 19.7 | 8.7 | 1.5 | Bal. |
| Example 39 | 47.8 | 19.7 | 8.7 | 1.5 | Bal. |
| Example 40 | 47.8 | 19.7 | 8.7 | 1.5 | Bal. |

TABLE 10

| | Production Conditions | | | |
|---|---|---|---|---|
| Sample No. | Calcining Temp. (° C.) | Pulverizing Time (hours) | Pulverized Particle Size (μm) | Sintering Temp. (° C.) |
| Example 34 | 700 | 4.0 | 0.66 | 950 |
| Comp. Ex. 24 | 700 | 4.0 | 0.66 | 1000 |
| Example 35 | 750 | 4.0 | 0.75 | 950 |
| Comp. Ex. 25 | 800 | 4.0 | 0.92 | 900 |
| Example 36 | 800 | 0.5 | 1.81 | 950 |
| Example 37 | 800 | 1.0 | 1.35 | 950 |
| Example 38 | 800 | 2.0 | 1.17 | 950 |
| Example 39 | 800 | 4.0 | 0.92 | 950 |
| Example 40 | 800 | 8.0 | 0.66 | 950 |

TABLE 11

| | Properties | | | | | |
|---|---|---|---|---|---|---|
| | Dav[(1)] | Density[(2)] | Tc[(3)] | μi[(4)] | Q[(5)] | |
| Sample No. | (μm) | (g/cm³) | (° C.) | 100 kHz | 5 MHz | 5 MHz | 10 MHz |
| Example 34 | 3.88 | 5.09 | 352 | 84 | 83 | 111 | 92 |
| Comp. Ex. 24 | 6.55 | 5.04 | 352 | 91 | 89 | 110 | 90 |
| Example 35 | 3.61 | 5.10 | 352 | 84 | 83 | 110 | 93 |
| Comp. Ex. 25 | 1.21 | 4.76 | 352 | 57 | 56 | 113 | 99 |
| Example 36 | 3.38 | 4.97 | 352 | 78 | 77 | 109 | 95 |
| Example 37 | 3.38 | 5.01 | 352 | 80 | 78 | 115 | 97 |
| Example 38 | 3.38 | 5.06 | 352 | 81 | 80 | 115 | 96 |

TABLE 11-continued

| | | | | Properties | | | |
|---|---|---|---|---|---|---|---|
| | Dav[1] | Density[2] | Tc[3] | μi[4] | | Q[5] | |
| Sample No. | (μm) | (g/cm³) | (° C.) | 100 kHz | 5 MHz | 5 MHz | 10 MHz |
| Example 39 | 3.49 | 5.07 | 352 | 84 | 82 | 114 | 98 |
| Example 40 | 3.49 | 5.11 | 352 | 86 | 85 | 113 | 95 |

Note:
[1] Average crystal grain size
[2] Density of sintered body
[3] Curie temperature
[4] Initial permeability
[5] Quality factor

TABLE 12

| | Core Loss (5 MHz and 10 mT) | | |
|---|---|---|---|
| Sample No. | 20° C. | 100° C. | 120° C. |
| Example 34 | 59 | 105 | 144 |
| Comp. Ex. 24 | 48 | 103 | 159 |
| Example 35 | 53 | 101 | 143 |
| Comp. Ex. 25 | 190 | 202 | 237 |
| Example 36 | 60 | 105 | 147 |
| Example 37 | 65 | 103 | 142 |
| Example 38 | 256 | 310 | 357 |
| Example 39 | 54 | 102 | 143 |
| Example 40 | 57 | 115 | 174 |

| | Core Loss (5 MHz and 20 mT) | | | | | | | Ps |
|---|---|---|---|---|---|---|---|---|
| Sample No. | 0° C. | 20° C. | 40° C. | 60° C. | 80° C. | 100° C. | 120° C. | (%) |
| Example 34 | 695 | 820 | 926 | 1111 | 1402 | 1797 | 2319 | 119 |
| Comp. Ex. 24 | 579 | 885 | 1296 | 1744 | 2167 | 2599 | 3075 | 194 |
| Example 35 | 676 | 771 | 940 | 1162 | 1438 | 1740 | 2149 | 126 |
| Comp. Ex. 25 | 765 | 867 | 1100 | 1357 | 1592 | 1864 | 2232 | 115 |
| Example 36 | 703 | 823 | 998 | 1215 | 1436 | 1753 | 2118 | 113 |
| Example 37 | 741 | 843 | 930 | 1092 | 1323 | 1595 | 1942 | 89 |
| Example 38 | 1055 | 1161 | 1330 | 1540 | 1797 | 2231 | 2694 | 92 |
| Example 39 | 690 | 771 | 948 | 1127 | 1396 | 1704 | 2080 | 121 |
| Example 40 | 715 | 1201 | 1598 | 1952 | 2276 | 2705 | 3150 | 125 |

Note:
(1) Nod measured

As is clear from Table 12, the sintered Ni ferrite body of the present invention exhibited low core loss in a wide temperature range. In addition, as a result of counting the number of crystal grains having a maximum diameter of 10 μm or more surrounded by grain boundaries in a SEM photograph of 3000 times (observed area: 33 μm×43 μm) for a sample of each sintered Ni ferrite body obtained by thermal etching at a temperature 50° C. lower than the sintering temperature, the number of crystal grains in the sintered Ni ferrite bodies of any of the examples was 10 or less. Comparative Example 24 in which the difference between the calcining temperature and the sintering temperature is large as 300° C. had the large average crystal grain size and the core loss change ratio Ps exceeding 185%. Comparative Example 25 in which the difference between the calcining temperature and the calcining temperature was small as 100° C. had the small average crystal grain size and also had density of the sintered body of less than 4.85 g/cm³.

What is claimed is:

1. A sintered Ni ferrite body having a composition comprising, calculated as oxide, 47.0-48.3% by mol of $Fe_2O_3$, 14.5% or more and less than 25% by mol of ZnO, 8.2-10.0% by mol of CuO, and more than 0.6% and 2.5% or less by mol of CoO, the balance being NiO and inevitable impurities, and having an average crystal grain size of more than 2.5 μm and less than 5.5 μm.

2. The sintered Ni ferrite body according to claim 1, wherein less than 4 parts by mass of Sn calculated as $SnO_2$, based on 100 parts by mass of the total amount of $Fe_2O_3$, ZnO, CuO, CoO and NiO, is contained.

3. The sintered Ni ferrite body according to claim 1, which has a composition comprising, calculated as oxide, 47.3-48.2% by mol of $Fe_2O_3$, 14.8-24.8% by mol of ZnO, 8.3-9.5% by mol of CuO, and 0.65-2.4% by mol of CoO, the balance being NiO and inevitable impurities.

4. The sintered Ni ferrite body according to claim 1, wherein said sintered Ni ferrite body has a density of 4.85 g/cm³ or more.

5. The sintered Ni ferrite body according to claim 1, wherein said sintered Ni ferrite body has core loss Pcv20 of 1800 kW/m³ or less at 20° C. and core loss Pcv100 of 3000 W/m³ or less at 100° C., at a frequency of 5 MHz and at an exciting magnetic flux density of 20 mT.

6. The sintered Ni ferrite body according to claim 5, wherein the minimum temperature of core loss Pcv is less than 80° C.

7. The sintered Ni ferrite body according to claim 5, wherein a core loss change ratio Ps calculated by the following formula (1):

$$Ps(\%) = [(Pcv100 - Pcv20)/Pcv20] \times 100 \qquad (1),$$

is 185% or less.

8. A coil device formed by winding a wire around a magnetic core made of said sintered Ni ferrite body of claim 1.

9. A method for producing said sintered Ni ferrite body of claim 1, comprising the steps of
- mixing an iron oxide powder, a zinc oxide powder, a copper oxide powder, and a nickel oxide powder to form a raw material powder;
- calcining the raw material powder at a temperature of 700-850° C. to form a calcined body;
- pulverizing the calcined body with cobalt oxide, or cobalt oxide and tin oxide, for 0.5-8 hours to form a pulverized powder,
- molding the pulverized powder to form a green body, and
- sintering the green body at a temperature of 900-1000° C.

10. The method for producing said sintered Ni ferrite body according to claim 9, wherein said pulverized powder has a particle size of 0.5-1.5 μm.

11. The sintered Ni ferrite body according to claim 1, wherein said sintered Ni ferrite body has an average crystal grain size of more than 3.0 μm and less than 5.5 μm.

* * * * *